Aug. 25, 1953
C. L. MARKS
2,650,259
HIGH-PRESSURE SEAL FOR CABLE END TERMINALS
Filed March 10, 1951
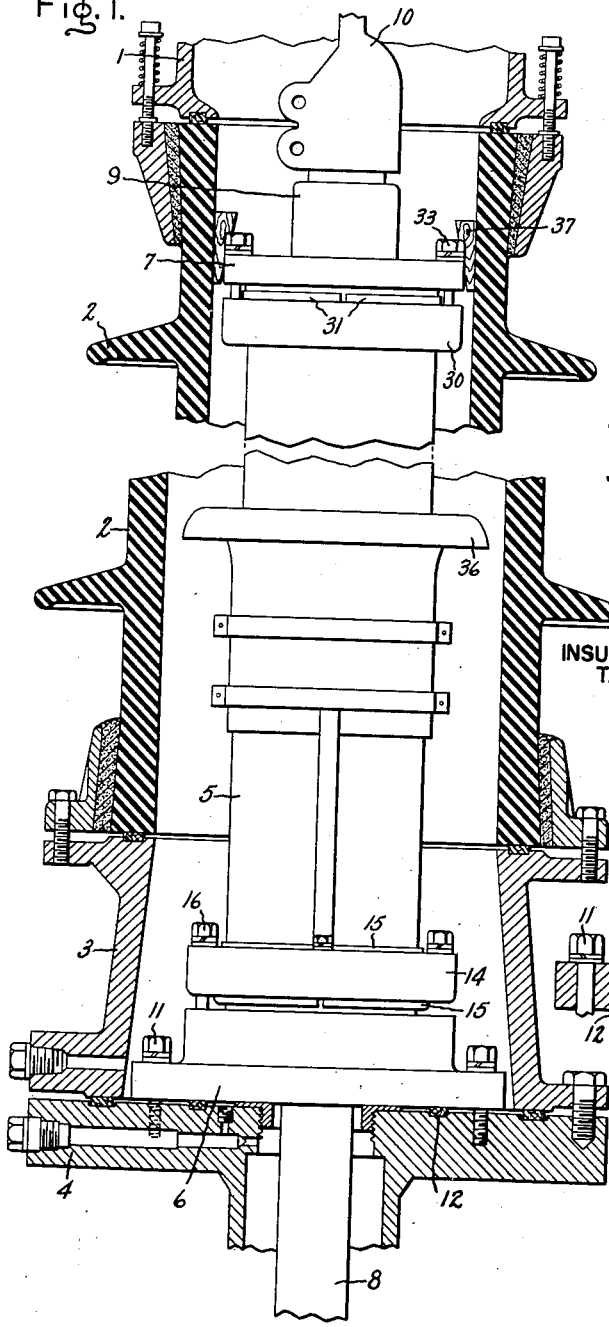
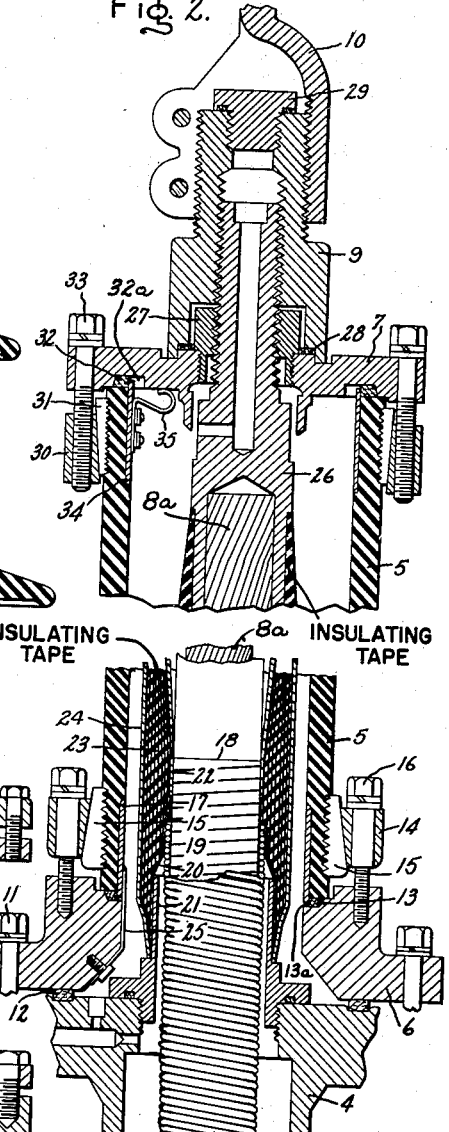
Inventor:
Charles L. Marks,
by
His Attorney.

Patented Aug. 25, 1953

2,650,259

UNITED STATES PATENT OFFICE 2,650,259

HIGH-PRESSURE SEAL FOR CABLE END TERMINALS

Charles L. Marks, Pittsfield, Mass., assignor to General Electric Company, a corporation of New York Application March 10, 1951, Serial No. 214,958

2 Claims. (Cl. 174—20)

This invention relates to seals for containing fluids under high pressure and more particularly to such seals employed with insulating cylinders in electrical terminal apparatus.

Electrical cables containing insulating fluids, such as gas or oil, under high pressure are ordinarily terminated in potheads or like terminal apparatus. With polyphase cables, a spreader is utilized to bring out the separate phase conductors to individual potheads. In each pothead a joint is made between the electrical conductor of the cable and a terminal stud which is part of the pothead. Normally this joint is housed in an insulating cylinder to which access is provided for entrance of the fluid insulating means of the cable. In fact, the insulating cylinder ordinarily serves as the terminus for the fluid path of the cable. This use of the same insulating medium in the insulating cylinder as in the cable avoids the use of relatively expensive barriers between the cable and the insulating cylinder as would be necessary if the insulating medium in the insulating cylinder were different from that in the cable.

In order to terminate the fluid path, the insulating cylinder, which is commonly wound of laminations of resin impregnated paper or fabric, must be sealed to a cover plate at its end adjacent the terminal stud and to an annular supporting or base plate at its other end. Conventionally these seals have been accomplished by compressing wide flat gaskets between the ends of the cylinder and the cover and base plates. The necessary compressive force has been provided by bolting the cover and base plates to supports firmly attached to the cylinder. These supports are usually in the form of ring members pressed onto the outside of the cylinder and pinned thereon by means of radial pins extending into the cylinder wall. Although structures of that sort have given reasonably satisfactory service, they entail a major disadvantage in that additional cylinder wall thickness above that necessary for insulating purposes is required to support the radial pins. Since the difficulty of winding laminated insulating cylinders without voids between laminations increases with the wall thickness of the cylinders, any reduction in wall thickness becomes a distinct advantage from a manufacturing standpoint.

It is an object of this invention, therefore, to provide new and improved means for sealing an insulating cylinder to adjacent members, such as cover and base plates.

It is another object of this invention to provide a new and improved structure for securing a sealing assembly to a laminated insulating cylinder.

In carrying out this invention, a pair of cooperating concentric ring members are disposed around the insulating cylinder. The inner ring member is divided into a plurality of segments while the outer member is a continuous ring. The inner surface of the segmental ring member is provided with serrations for engaging the cylinder wall, and its outer surface is tapered to have an outer diameter decreasing in a direction away from the adjacent member, such as the cover plate, to which the cylinder is to be sealed. The inner surface of the outer ring is also tapered but in a direction oppositely from the outer surface of the segmental ring member so that the two surfaces engage or mate with each other.

Then, when the outer ring member is bolted to the cover plate and the bolts tightened so as to displace the outer ring member toward the cover plate, the interaction between the engaging tapered surfaces of the ring members forces the inner ring member against the cylinder. The resultant friction between the serrations of the inner ring member and the cylinder wall, in effect, secures the inner ring member to the cylinder and prevents relative movement between the two. Due to the engagement of the tapered surfaces, this also stops movement of the outer ring member relative to the cylinder. Thus as the bolts are further tightened, the cylinder and the cover plate tend to be pulled together. To form the desired seal between the cylinder and the cover plate, gasket material is placed between the two so that it is compressed as they are pulled together.

For a better and more complete understanding of my invention, together with additional objects and advantages thereof, reference should now be had to the following description and accompanying drawing in which:

Fig. 1 is a fragmentary view partially in section of a pothead embodying this invention;

Fig. 2 is an enlarged view in section of a portion of Fig. 1 illustrating the sealing means of this invention as applied with an insulating cylinder and a cover plate; and Fig. 3 is an enlarged view in section of another portion of Fig. 1 illustrating the sealing means of this invention as applied with an insulating cylinder and a supporting or base plate.

Referring to the drawing, in Fig. 1 is shown a cable terminus or pothead embodying the sealing means of this invention. The outer shell or boundaries of the pothead includes a metal dome 1, a porcelain insulator 2, a metal supporting member 3, and a metal mounting plate 4. Enclosed within this shell is an insulating cylinder 5 which is mounted at its one end on an annular base plate 6 and sealed off at its other end by a cover plate 7. An armored insulated conductor 8 and the fluid insulating means surrounding it under high pressure in the cable (not shown) of which it is a part enter cylinder 5 through a passage in mounting plate 4 and the aperture in base plate 6. Cylinder 5 serves both as a housing for a joint between conductor 8 and a terminal stud 26 (shown in Fig. 2) of the pothead and also as a terminus for the flow path of the high pressure insulating fluid of the cable. The terminal stud 26 connected to stripped conductor 8a is joined through a terminal cap 9 to a flexible terminal lead 10 which passes out through the top (not shown) of dome 1. The space between the shell and the members contained therein is ordinarily filled with oil or other fluid insulating means under normal atmospheric pressure.

In order that the high pressure fluid insulating medium of the cable be contained from the low pressure fluid filling the space between the shell and the enclosed members, cylinder 5 is sealed to cover plate 7 and base plate 6, as previously mentioned, and base plate 6 is sealed to mounting plate 4. As may be seen by reference to Fig. 1, the seal between plates 4 and 6 is accomplished by drawing them together with bolts 11 to compress an annular gasket 12. The seal between cylinder 5 and base plate 6 is similarly accomplished by pulling the two members together to compress gasket material 13.

A new and improved structure is provided for gripping cylinder 5 so that the force for compressing gasket material 13 may be applied to it. The structure consists of a continuous ring member 14 and a multi-section segmental ring member 15. Preferably, ring member 15 has three segments but that number is not essential to the functioning of the structure. The inner surface of segmental ring 15, which is in contact with cylinder 5, is provided with serrations to aid in gripping the cylinder, and the outer surface of ring 15 is tapered to have an outer diameter which decreases in the direction away from base plate 6. This outer surface engages the inner surface of continuous ring 14, which is also tapered but in the opposite direction.

To draw cylinder 5 and base plate 6 together, the bolts 16, which extend through holes in continuous ring 14 into tapped recesses in base plate 6, are tightened. As bolts 16 are tightened, an axial force is brought to bear on ring 14. This axial force tries to pull the tapered inner surface of ring 14 along the oppositely tapered outer surface of ring 15 and thereby causes a force having both radial and axial components to be transmitted to segmental ring 15. The radial components press the segments of ring 15 against insulating cylinder 5 so that the serrations bite into the cylinder wall. This friction between the serrations of ring 15 and the outer wall of cylinder 5 takes up the axial force transmitted to ring 15 by the mating tapered surfaces and prevents relative motion between the ring members and the cylinder. Thus an outer ring 14 is drawn toward base plate 6, it pulls inner ring 15 and cylinder 5 along with it until the cylinder is drawn firmly against the base plate so as to compress gasket material 13 sufficiently to effect an initial seal.

To add strength to the wall of cylinder 5, so that the radial forces applied to it will not cause the wall to collapse, a metal sleeve or tube 17 is placed in a recess cut in the inner surface of the wall. In order that it may in conjunction with a recess 13a cut in base plate 6, define a packing cavity for gasket material 13, tube 17 is made long enough to protrude slightly beyond the extremity of cylinder 5.

This structure for obtaining a seal between the base plate and the insulating cylinder possesses a distinct advantage in that it does away with the need for radial pins to hold the bolt supporting member to the cylinder wall. This permits the use of insulating cylinders of smaller wall thickness than can be used with structures requiring the use of radial pins. Moreover, since the greater the internal pressure of the fluid being sealed becomes, the greater is the force acting on the ring members, a pressure-seal type gasket seal is obtained. Placing the gasket material in a packing cavity in the base plate which is almost but not completely closed by the portion of the tube extending beyond the end of the cylinder aids in forming such a seal. The pressure-seal type gasket seal provides an automatic seal which is proportional to the internal pressure of the fluid being sealed. This tends to do away with the high initial compressive bolting forces usually encountered in apparatus when wide, flat gaskets are used against the end of the insulating cylinder.

The electrical assembly contained within cylinder 5 is similar to that found in conventional potheads for use with high pressure self-contained cables. The section shown in Fig. 3 is adjacent the point where a joint is made between stripped conductor 8a and a terminal stud 26, the insulating and shielding means shown being designed to prevent the voltages stresses around the joint from reaching a dangerous value. To prepare conductor 8 for the joint, its copper shielding tape is terminated at point 18 and a portion 19 of the surrounding armor is stripped back and wound around the conductor. In the drawing, the size of the armor is exaggerated for purposes of clarity. The armor is grounded by a copper braid 20 to a metal ferrule 21 which is in threaded engagement with and gasketed to mounting plate 4. Once the joint is made and covered with insulation, a metal shielding tape 22 is placed over it and onto the end of the copper shielding tape of the cable. Then the ferrule, the armor, and the shielding tape are all covered with the varnished cambric tape 23, for a semi-stop seal and a metal binding 24 is placed over the tape to give it mechanical strength. To prevent cylinder reinforcing tube 17 from picking up stray voltage, it is grounded to base plate 6 by a grounding strip 25. This electrical insulating, shielding and semi-stop assembly may vary appreciably as necessary or desired in potheads terminating conductors of various sizes and voltages.

In Fig. 2, is shown the upper portion of the above mentioned joint between conductor 8a and the terminal stud 26. Although various type joints may be used in potheads, the joint shown between conductor 8a and terminal stud 26 is a pressure attached connection as can be made in a hydraulic press. Terminal stud 26 extends through an aperture in cover plate 7 and is held therein by a terminal nut 27 which is threaded to both members. Two axially extending projections on cover plate 7 are positioned to engage flats on stud 26 and prevent it from turning if it should start to do so. Terminal cap 9 is threaded on the upper portion of stud 26 and compresses gasket material 28 against cover plate 7 to provide a seal around the aperture in the cover plate. A threaded plug 29 with an associated gasket seals the center bore of terminal cap 9. Electrical connections through the top (not shown) of dome 1 is made by flexible terminal stud 10 which is threaded on cap 9.

Cylinder 5 is sealed to cover plate 7 by a structure similar to that used to seal it to base plate 6. The structure consists of an outer continuous ring 30 and an inner segmental ring member 31. The inner surface of segmental ring 31 is serrated and contacts the wall of cylinder 5. The outer surface of segmental ring 31 and the inner surface of ring 30 are tapered in opposite directions so as to mate with each other. To draw cylinder 5 against cover plate 7 so as to compress gasket material 32, an axial force is applied to ring 30 through bolts 33. As this force is transmitted through the engaging tapered surfaces of ring members 30 and 31, it appears with both radial and axial components on segmental ring 31. As with the similar structure described hereinbefore, the radial force components cause the serrations on the inner surface of segmental ring 31 to bite into the wall of cylinder 5 so that the axial force components pull the cylinder against cover plate 7. To strengthen cylinder 5 against the radial forces, a metal tube 34 is pressed in a recess cut in the inner wall of the cylinder. Tube 34 extends beyond the end of cylinder 5 and together with an annular recess 32a cut in cover plate 7 provides a packing cavity for gasket material 32. Tube 34 is electrically connected to cover plate 7 by a clip 35 so that no charge can be built up on the tube. The same advantages obtained by using this sealing structure at the base plate end of cylinder 5 are obtained by its use at the cover plate end. In both cases less cylinder wall thickness is required and a pressure-seal type gasket seal is obtained.

In Fig. 1, additional details of the pothead construction are shown, such as the spun copper shield 36 and the wooden bracing blocks 37. However, since the pothead is of conventional design except for the new and improved sealing means, it is believed that further description of these salient features is unnecessary.

While there have been described what at present are considered to be preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim as new and desire to secure by Letters Patent of the United States is:

1. In an electrical terminal apparatus for sealing the end of a fluid filled cable, including an insulating cylinder and a member adjacent said cylinder, a structure for sealing said cylinder to said adjacent member comprising an inner segmental ring member disposed around said cylinder having an inner surface provided with serrations for engagement with the outer surface of said cylinder and having an outer surface tapered to have an outer diameter decreasing in the direction away from said adjacent member; an outer continuous ring member concentric with said inner ring member and having an inner surface tapered oppositely to the outer surface of said inner ring member for engagement with said outer surface; gasket material positioned between said cylinder and said adjacent member; and means for displacing said outer ring member toward said adjacent member to secure said inner ring against said cylinder for drawing together said cylinder and said adjacent member to compress said gasket material.

2. In an electrical terminal apparatus for sealing the end of a fluid filled cable, including an insulating cylinder and a member adjacent said cylinder containing an annular recess in its surface bordering said cylinder, a structure for sealing said cylinder through said adjacent member comprising a reinforcing tube having a portion contained within said cylinder and a portion extending beyond said cylinder into said recess to define a packing cavity; an inner segmental ring member disposed around said cylinder having an inner surface provided with serrations for engagement with the outer surface of said cylinder and having an outer surface tapered to have an outer diameter decreasing in the direction away from said adjacent member; an outer continuous ring member concentric with said inner ring member and having an inner surface tapered oppositely to the outer surface of said inner ring member for engagement with said outer surface; gasket material contained in said packing cavity; and bolt means for displacing said outer ring member toward said adjacent member to secure said inner ring member against said cylinder for drawing together said cylinder and said adjacent member to compress said gasket material.

CHARLES L. MARKS.

References Cited in the file of this patent

UNITED STATES PATENTS

| Number | Name | Date |
| --- | --- | --- |
| 1,915,838 | Sprong | June 27, 1933 |
| 2,173,643 | Moser | Sept. 19, 1939 |
| 2,452,580 | Lee | Nov. 2, 1948 |
| 2,524,539 | Perolini | Oct. 3, 1950 |